(12) United States Patent
Hirata et al.

(10) Patent No.: US 7,059,725 B2
(45) Date of Patent: Jun. 13, 2006

(54) REFLECTION-TYPE IMAGE PROJECTION UNIT AND A REFLECTION-TYPE IMAGE DISPLAY APPARATUS, AND A LIGHT SOURCE DEVICE FOR USE THEREIN

(75) Inventors: Koji Hirata, Tokyo (JP); Masahiko Yatsu, Tokyo (JP); Naoyuki Ogura, Tokyo (JP); Nobuo Masuoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/859,415

(22) Filed: Jun. 1, 2004

(65) Prior Publication Data
US 2004/0218281 A1 Nov. 4, 2004

Related U.S. Application Data

(62) Division of application No. 10/328,336, filed on Dec. 23, 2002.

(30) Foreign Application Priority Data
Jun. 12, 2002 (JP) ............................. 2002-171796

(51) Int. Cl.
*G03B 21/28* (2006.01)
*G02F 1/00* (2006.01)
*G02F 1/1335* (2006.01)

(52) U.S. Cl. ............................. 353/81; 353/33; 353/20; 348/756; 348/757; 349/9

(58) Field of Classification Search ............ 353/30–34, 353/20, 81
See application file for complete search history.

(56) References Cited

U.S. PATENT DOCUMENTS

| 6,176,586 B1 | 1/2001 | Hirose et al. | |
| 6,280,034 B1 * | 8/2001 | Brennesholtz | 353/20 |
| 6,384,972 B1 * | 5/2002 | Chuang | 359/495 |
| 6,402,323 B1 * | 6/2002 | Shiue et al. | 353/20 |
| 6,419,362 B1 * | 7/2002 | Ikeda et al. | 353/20 |
| 6,672,722 B1 * | 1/2004 | O'Connor et al. | 353/34 |

* cited by examiner

*Primary Examiner*—W. B. Perkey
*Assistant Examiner*—Andrew Sever
(74) *Attorney, Agent, or Firm*—Townsend and Townsend and Crew LLP

(57) ABSTRACT

In a reflection-type image projecting unit, being applicable into a reflection-type image display apparatus, being superior in contrast and achieving small-sizing of the apparatus, together with a light source for use therein, a light flux including three (3) color components, R, G and B, emitted from a light source portion 100, are modulated and synthesized by means of reflection-type liquid crystal panels 221, 222 and 223 in an optical engine 200, which is constructed with three (3) prism-like polarization light beam splitters, to be emitted therefrom, wherein those three (3) prism-like polarization light beam splitters are so displosed, that the G-component light of the three component lights R, G and B modulated on the reflection-type liquid crystal panel elements penetrates through two (2) of the prism-like polarization light beam splittrers 231 and 232, to be emitted therefrom, while the others, the B-component light and the R-component light penetrate therethrough after being reflected thereupon, or they are reflected after penetrating therethrough, while taking the planes of polarization lights of the propagating lights into the consideration.

9 Claims, 6 Drawing Sheets

B(P), G(P) AND R(P)
OR B(S), G(S) AND R(S)

REFLECTION-TYPE IMAGE PROJECTION UNIT AND A REFLECTION-TYPE IMAGE DISPLAY APPARATUS, AND A LIGHT SOURCE DEVICE FOR USE THEREIN

BACKGROUND OF THE INVENTION

The present invention relates to a reflection-type image projection unit or device for projecting an image therefrom, using an image display element therein, such as a reflection-type liquid crystal panel, for example, further a reflection-type image projection display apparatus using such an image projection device therein, and further it relates also to a light source device for use therein.

Conventionally, various types or methods are already known for a video or image display apparatus of the reflection-type, in which light from a light or optic source of high brightness, such as a metal halide lamp or a super high-pressure mercury lamp, etc., for example, are irradiated upon an image display element, such as the reflection-type liquid crystal, for example, thereby projecting the reflected light upon, for example, a screen, etc., through a projection optical system, which is made up with a projection lens, etc., and also various improvements and proposals are made for it.

First of all, for example in Japanese Patent Laying-Open No. 2000-81603 (JP-A 81603/2000) is already known a projection display system for use with a reflection-type liquid crystal panel, wherein after projection of the light upon LCDs (i.e., the reflection-type liquid crystal panel elements), being emitted from the optic source portion and divided into three (3) components (R,G,B) being different in the wavelengths, the reflected light from those LCDs are optically synthesized or combined using two (2) pieces of dichroic mirrors and two (2) pieces of plate-like beam splatters, thereby projecting those through the projection lens onto a wide display, such as an image screen, for example.

However, in particular, since the liquid crystal projector apparatus or device of rear-projection-type must be thin in the thickness, it is desirable that the size of the apparatus as a whole be small when it is used as a projection unit. From the viewpoint of small-sizing of such a device, in order to make an optical system small, to shorten the optical path thereof, and further to improve an accuracy in manufacturing of the optical system, as was shown or disclosed in Japanese Patent Laying-Open No. Hei 11-153774 (JP-A153774/1999) or Japanese Patent Laying-Open No. Hei 11-326834 (JP-A 326834/1999), for example, a reflection-type light modulation projector was already provided or known, in which the light of three (3) color components reflected upon the three (3) reflection-type image display elements are optically combined or synthesized by means of a dichroic mirror of a prism-type (i.e., a dichroic prism) or a polarization beam splitter (PBS).

Additionally, for example, in Japanese Patent Laying-Open No. 2000-284228 (JP-A284228/2000), for achieving the small-sizing of the liquid crystal projector apparatus, in particular for solving large-sizes of the apparatus due to the disposition of the conventional art, i.e., the dichroic prism and three (3) pieces of the prism-type PBSs, surrounding it in three (3) directions thereof, there is proposed the structure, in which four (4) pieces of the prism-type dichroic mirrors (i.e., the dichroic prisms) and the prism-type polarization beam splitters (i.e., PBSs) are disposed in a block-like manner, building up a color division portion, a GB modulator portion, an R modulator portion and a color synthesizer portion, respectively, and further in which the optical path is prevented from turning around in excess by using a narrow bandwidth phase (difference) plate, thereby enabling the small-sizing of the apparatus.

Furthermore, for example, in Japanese Patent Laying-Open No. 2001-154294 (JP-A 154294/2001) are proposed various constructions of the image display device, in details, for achieving the small-sizing, light-weighting, as well as, low-cost, brightness and high picture quality, and herein are provided various structures of an optical engine, wherein an optical image is formed or synthesized from the light emitted from the optical source, corresponding to an image signal, and thereby emitting the reflected light synthesized.

However, with such the conventional arts mentioned above, in particular as is representatively shown in the Japanese Patent Laying-Open No. 2000-81603 (JP-A81603/2000) mentioned above, i.e., with such the method of obtaining the optical synthesizing by using plural plate-like dichroic filters and plate-like polarization beam splitters, since a space within the optical path is not filled up with a medium (though being filled up with the air), the back-focus is long when seeing a light division/synthesizing portion from the projection lens, therefore it is difficult to make compensation or calibration on the focusing capacity and/or distortion, etc. Also, since the light beam emitted from the optic or light source has an extent or expanse, the structure still is insufficient for obtaining the small-sizing of the apparatus. Further, since it is large in the optical system thereof, it is also difficult to be manufactured through assembling with high accuracy.

Also, with such the structure of the projection-type image display apparatus, as was already known from Japanese Patent Laying-Open No. Hei 11-153774 (JP-A153774/1999) or Japanese Patent Laying-Open No. Hei 11-326834 (JP-A 326834/1999) mentioned above, and further the Japanese Patent Laying-Open No. 2001-154294 (JP-A 154294/2001) mentioned above, indeed, comparing to the structure built up by using the plural plate-like dichroic filters and the polarization beam splitters known by the Japanese Patent Laying-Open No. 2000-81603 (JP-A 81603/2000) mentioned above, it is able to achieve the small-sizing of the apparatus, however with the picture quality obtainable on the apparatus, it still has the following problems, in particular relating to the capacity of contrast.

Namely, in the projection-type image display apparatus, generally the light divided in the color dividing portion forms an optical image in a G modulator portion, a B modulator portion and a R modulator portion, each using the image display element, respectively, and thereafter they are synthesized with and projected onto the image screen through the projection lens, so as to obtain an image thereon. In this instance, with the photo-elastic constant or ratio of the material making up the opt-synthesizing optical system therefrom, it is possible to obtain an expanded projection image with less color shading and/or shading in brightness, by combining the materials, respectively, being different in the wavelength at which the photo-elastic constant lies at the minimum depending upon the optical path for the color light beams to be synthesized and/or the relative visibility thereof. In particular, with the contrast, it is possible to obtain a preferable expanded projection image with using the material being smallest in the photo-elastic constant with respect to a green color light (G), which shows the largest value in the relative visibility. Also, in particular, the polarization light beam splitter (PBS) of the prism-type, for making up the light dividing/synthesizing portion, shows the great difference in the characteristics thereof, in particular in the case when it is used in the light dividing/synthesizing portion under the condition of penetrating the light beam therethrough, and in the case when it is used under the condition of reflecting it thereupon. And also, since an illumination light has an angle component for a F value, an amount of light leakage differs greatly, in the case where it is used under the condition of reflection and in the case where it is used under the condition of penetration, and therefore the difference is generated in the attenuation factor thereof. However with those conventional arts mentioned above, it is still under the situation at the present, that no proposal is made for the light dividing/synthesizing optical system, in which the consideration is fully paid on the problems, inherent or unique to those structural parts or elements thereof.

BRIEF SUMMARY OF THE INVENTION

Then, according to the present invention, for solving the above-mentioned problems in the projection-type image display apparatus that was preciously provided with the conventional arts mentioned above, in more details, an object of the present invention is, within an apparatus of disposing dichroic prisms and PBS prisms in a square block-like manner, with which can be achieved the small-sizing of the apparatus, while applying a narrow-bandwidth phase plate to a predetermined color spectrum, etc., thereby to prevent the optical path from turning round in excess, to provide a projection-type image display apparatus being able to obtain a superior projection image expanded, wherein the positions of the prism-like PBSs for making up a light synthesizing system, in particular lay-out thereof are determined while taking into the consideration the plane of polarization, with respect to a color light being large in the relative visibility, which strongly gives influences on the capacity of contrast. Thus, according to the present invention, a more preferable expanded projection image can be obtained with a new structure or configuration, with which a leakage of light within the light synthesizing optical system is made to be the minimum, in particular the green color (G) light being large in the relative visibility among the light beams obtained as a result of the optical combination or synthesizing thereof.

Also, according to the present invention, other object is to provide a projection-type image display apparatus of using the reflection-type image projection unit or device, according to the present invention mentioned above therein, and further to provide an optic or light source device for use therein.

For accomplishing the object mentioned above, according to the present invention, first of all, there is provided a reflection-type image projection unit or device, comprising: a light dividing/synthesizing portion, being built up with prism-like polarization light beam splitters in a plural number thereof, for dividing and synthesizing a light flux including at least three light components, differing from one another in wavelength thereof into and from the light components; and at least three reflection-type image display devices, each for modulating the light thereon, and being provided corresponding to said light components, wherein said light dividing/synthesizing portion is so constructed that a specific one light component of the three light components modulated on said three reflection-type image display devices penetrates through said plural number of prism-like polarization light beam splitters, to be emitted therefrom, while the other two of the light components penetrate through after being reflected upon said plural number of prism-like polarization light beam splitters, to be emitted therefrom, or reflected thereupon after penetrating therethrough, to be emitted therefrom.

Further, according to the present invention, preferably, in the reflection-type image projection unit as defined in the above, wherein said specific one light component is a green-color (G) light component, while said other two of the light components are a red-color (R) light component and a blue-color (B) light component.

Also, according to the present invention, in the reflection-type image projection unit as defined in the above, wherein said light dividing/synthesizing portion may be constructed with three prism-like polarization light beam splitters, being disposed in a form of "L", or wherein a dichroic mirror may be disposed in a recess portion of said three prism-like polarization light beam splitters, being disposed in the form of "L", or wherein a dichroic prism may disposed in a recess portion of said three prism-like polarization light beam splitters, being disposed in the form of "L".

Further, according to the present invention, the reflection-type image projection unit as defined in the above may further comprises means for aligning planes of polarization of the light components of an emission light from said plural number of polarization light beam splitters into a one direction, and in that case, preferably, all the light components of the emission light from said plural number of polarization light beam splitters are emitted from in a form of S polarization light by means of said means.

Also, according to the present invention, in the reflection-type image projection unit as defined in the above, wherein a narrow bandwidth phase plate may inserted between the beam splitter, through which two of the light components penetrate and the beam splitter, upon or through which the three light components are reflected or penetrate, among said three prism-like polarization light beam splitters, being disposed in the form of "L", or wherein further a ½ wavelength plate may be inserted between the beam splitter, through which only one of the light components penetrates, and the beam splitter, upon or through which the three light components are reflected or penetrate, among said three prism-like polarization light beam splitters, being disposed in the form of "L".

And also, according to the present invention, for accomplishing the object mentioned above, there is provided a reflection-type image display apparatus, comprising: a light source for emitting a light flux therefrom, and including therein at least three light components, being different from one another in wavelength thereof; reflection-type image display elements, each for modulating the light component included in the light flux emitted from said light source corresponding thereto; a light synthesizing portion including plural number of prism-type polarizing light beam splitters, for synthesizing those three light components modulated by means of said reflection-type image projecting portion, so as to emit an image light; and a light projector portion for expanding and projecting the image light emitted from said image projecting portion, wherein said beam splitters of the light synthesizing portion are so positioned, that a specific one of those three light components, being modulated on said three reflection-type image display elements, penetrates through said plural number of prism-like polarization light beam splitters, to be emitted therefrom, while the other two light components penetrate therethrough after being reflected upon said plural number of prism-like polarizing light beam splitters, or are emitted by reflection thereupon after penetrating therethrough. Further, the reflection-type image display apparatus may comprise a screen therein.

Moreover, according to the present invention, in the reflection-type image display apparatus as defined in the above, preferably, among the three different color components of the light emitted from said light source onto said reflection-type image projecting portion, one of the color components is different from the other two in the plane of polarization thereof, and in particular, said one light component is a red-color (R) light component, while said other two of the light components are a green-color (G) light component and a blue-color (B) light component. Or, according to the present invention, in the reflection-type image display apparatus as defined in the above, said one light component is a blue-color (B) light component, while said other two of the light components are a green-color (G) light component and a red-color (R) light component. Further, according to the present invention, in the reflection-type image display apparatus as defined in the above, preferably all the color component light of the emission light from said reflection-type image projecting device are either one of the P polarization light and the S polarization light.

Further, according to the present invention, for accomplishing the object mentioned above, there is provided a light source device for use in the reflection-type image display apparatus, comprising: a light source portion; a light collector for collecting light emitted from said light source portion, so as to emit a light flux in a predetermined direction; and further a polarizer for differing direction of one of the three different color component light of the light flux emitted from the other two.

And, according to the present invention, in the light source device for use in the reflection-type image display apparatus as defined in the above, preferably, said one light component is a red-color (R) light component, while said other two of the light components are a green-color (G) light component and a blue-color (B) light component, and more preferably, said red-color (R) light component is the S polarization light, while said green-color (G) light component and said blue-color (B) light component are the P polarization light, or in the light for use in the reflection-type image display apparatus as defined in the above, preferably, said one light component is a blue-color (B) light component, while said other two of the light components are a green-color (G) light component and a red-color (R) light component, and more preferably, said blue-color (B) light component is the S polarization light, while said green-color (G) light component and said red-color (R) light component are the P polarization light.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 3:
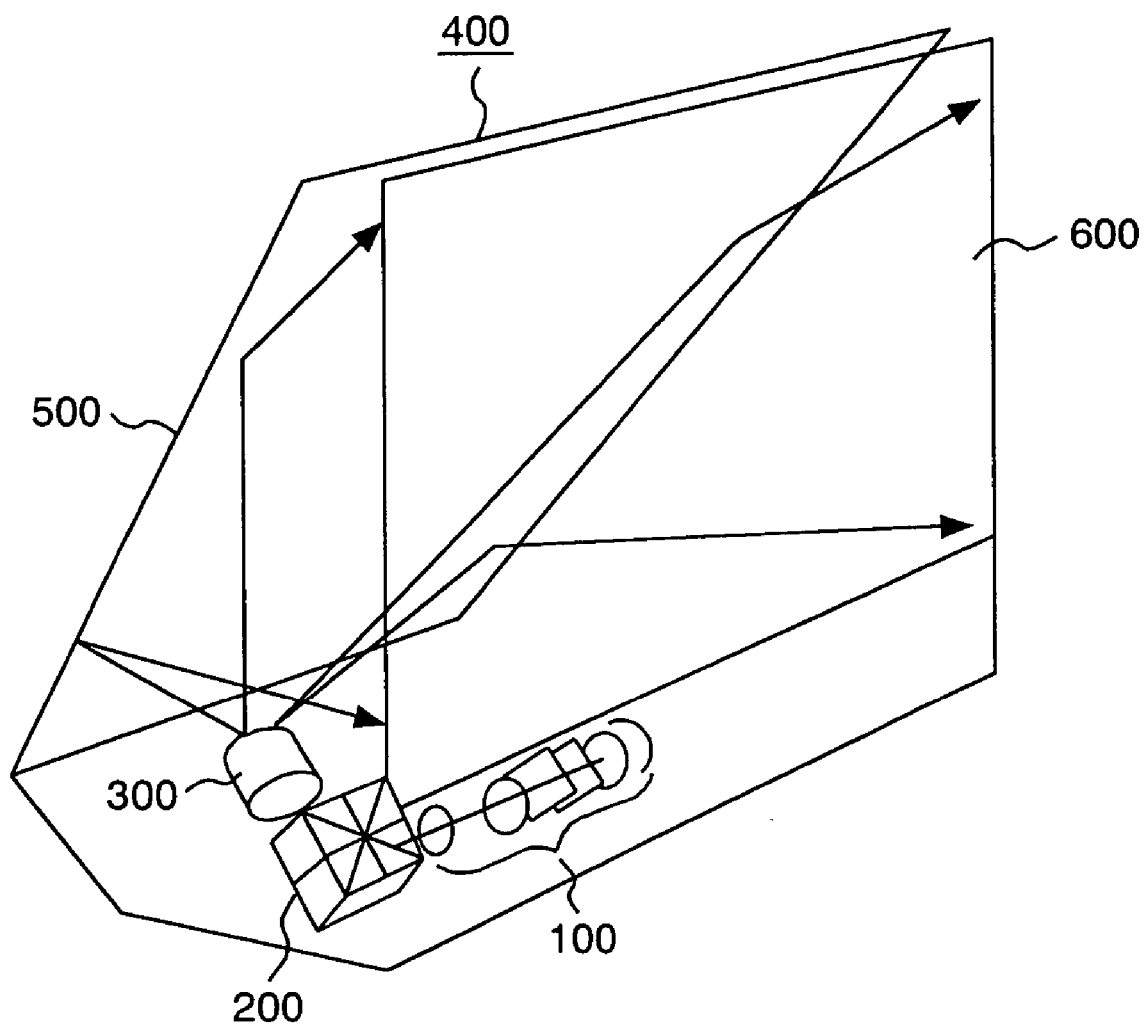
FIG. 3 is a perspective view for showing the inside of an apparatus, penetratingly, in particular the entire structure of a projection-type image display apparatus, according to an embodiment of the present invention.

Firstly, FIG. 3 is a perspective view for showing an inside of the apparatus, penetratingly, i.e., the entire structure of the projection-type image display apparatus, according to an embodiment of the present invention.

In this FIG. 3, a reference numeral 100 indicates an illumination optical system (i.e., a light source), though will be explained in more detail later, it is constructed with, including therein a so-called high-brightness optic or light source, such as a metal halide lamp or a super high-pressure mercury lamp, etc., for example. A reference numeral 200 indicates an optical engine, which comprises the characteristic portion of the projection-type image display apparatus, in particular, according to the present invention. And, after being incident upon a light dividing/synthesizing unit within the optical engine 200, the light emitted from the illumination optical system 100 mentioned above, as will be explained later again, are modulated and synthesized with in accordance with an image signal upon three (3) reflection-type image display elements of R (Red), G (Green) and B (Blue), respectively, and are bent at about a right angle to be emitted from. Thereafter, the emitted light is reflected upon a reflection mirror 500 provided in a rear surface of a cabinet 400 through a projection lens 300 building up a projection optical system, and then is projected on a screen 600. Further, arrows indicted in the figure indicate emitted light and reflected light.

Figure 4:
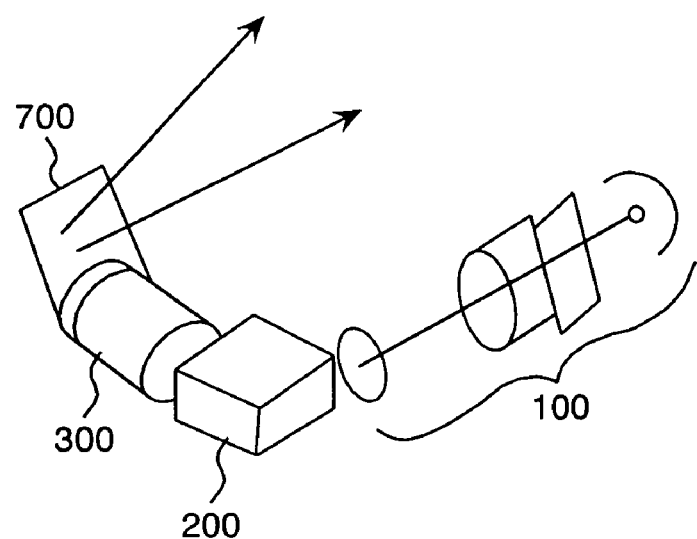
FIG. 4 is a perspective view for showing other embodiment of the optical system shown in FIG. 3 mentioned above.

Further, FIG. 4 attached is also a perspective view of the optical system according to another embodiment of the present invention. This optical system, comparing to the optical system shown in FIG. 3 mentioned above, differs from FIG. 3 in that a mirror 700 is provided in the vicinity of the projection lens 300, for converting (i.e., for bending) the emitted light in the optical axes thereof. However, with such the optical system, it is possible to project the emitted light from the projection lens 300 onto the screen, directly, thereby obtaining an expanded or enlarged projection image thereon.

Figure 5:
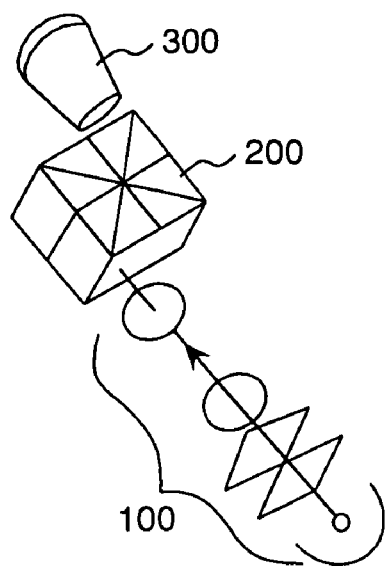
FIG. 5 is a perspective view for showing further other embodiment of the optical system shown in FIG. 3 mentioned above.

Further, FIG. 5 attached is a perspective view for showing still another embodiment of the optical system. Thus, in the optical system shown in this figure, differing from the optical system shown in FIG. 3 mentioned above, the emitted light from the projection lens are projected on the screen, directly, but without using the reflection mirror, thereby obtaining the expanded projection image thereon. However, in this case, the optical engine 200 mentioned above may be constructed to include therein the projection lens in a part thereof.

Continuing, an example of the structure of the optical engine 200 mentioned above will be shown in more detail by referring to FIG. 6 (herein, in particular, an example of the optical engine of the structure, which will be shown in FIG. 1 later), wherein the incident component light of R, G and B from the illumination optical system (i.e., the light source) 100 are modulated, and thereafter the light of components R, G and B are synthesized or built up with, thereby being emitted from (for example, onto the projection lens 300 provided in a rear stage thereof).

Figure 6:
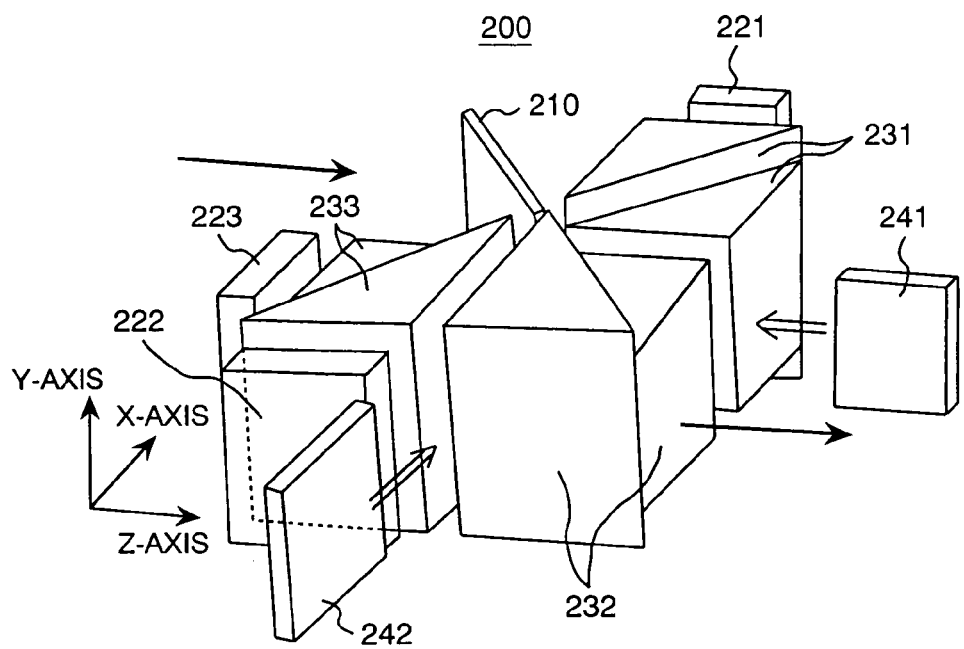
FIG. 6 is a perspective view for showing an example of structure of the optical engine in the projection-type image display apparatus shown in FIG. 3 mentioned above.

This FIG. 6 shows the structure of a central portion of the optical engine 200 mentioned above, and in the figure, a color separation portion is made up with a dichroic mirror 210, an image display portion (or, a modulation portion) equipped with three (3) pieces of reflection-type liquid crystal panels 221, 222 and 223, and respective synthesizing portions for each color component, equipped with three (3) pieces of prism-type polarization light beam splitters 231, 232 and 233. Also, arrows in the figure indicate the incident light and the emitted light upon and from this optical engine 200, respectively, while a reference numeral 241 in the figure indicates a polarization light converter element having selectivity on a specific wavelength, i.e., the so-called narrow bandwidth phase plate, which is inserted between the polarization light beam splitters 231 and 232 mentioned above, and further a reference numeral 242 indicates the narrow bandwidth phase plate inserted (or attached) between the polarization light beam splitters 232 and 233 mentioned above. However, although not shown in the figure herein, the dichroic mirror 210 and the polarization light beam splitters 231, 232 and 233 are mounted on a base portion for use of mounting thereof, thereby being disposed at a predetermined position accurately.

In more details, those polarization light converter elements mentioned above (i.e., each a phase plate: ½ wavelength) can be obtained, for example, by forming a metal multi-layer film through the evaporation technology, appropriately, on a side surface of the prism (i.e., the prism comprising the polarization light beam splitter mentioned above), which is made of material, such as "BSC7", "FD2", "FD1", "FD6" and "FDS90", etc., produced by HOYA, Co. Ltd., Japan. With the polarization light beam converter having such the structure (i.e., being adhered with on the light emission surface of the polarization light splitter), comparing to the conventional polarization light converter element having the structure of pasting and piling up the phase plates cut out in a strip-like form (for example, in a parallelogram in the cross-section) in a large number thereof, it is possible to achieve a further improvement in contrast, color shading, etc. This is because, in the conventional polarization light converter element having the structure of pasting and piling up the slit-like phase plates in the large number thereof, a little or small gap is resulted between the phase plates adjacent with each other because of tolerance (for example, manufacturing errors) caused upon pasting and piling-up of the phase plates, and for this reason, a P-polarization light, though it should be converted into a S-polarization light inherently, passes through unchanged (i.e., as the P-polarization light), thereby causing a phenomenon that the P-polarization light is mixed with the S-polarization light (i.e., a mixing ratio between the P-polarization light and the S-polarization light). On the contrary to this, with the structure of the polarization light converter element mentioned above, according to the present invention, it is only an end portion (for example, 0.25 mm or more or less) of the surface attached with the phase plate, where the P-polarization light mentioned above passes through unchanged, i.e., without conversion from the P-polarization light into the S-polarization light, and for this reason, it is possible to obtain a great improvement in the mixing ratio between the P-polarization light and the S-polarization light by a measure of cutting off the light passing through that part thereof. Furthermore, this is also applicable to a narrow bandwidth phase plate 250 which will be shown in FIG. 7, and a ½ wavelength plate (i.e., a prism 106c and a ½ wavelength plate 107) which will be shown in FIGS. 9 and 10, to be mentioned below.

However, in the place of the dichroic mirror 210 mentioned above, it is also possible to build up the polarization light converter element with a dichroic prism. Further, in this example, though the explanation was made that each of the polarization light beam splitters 231, 232 and 233 is made up with a combination of the prisms being different in the height thereof, respectively, by taking into the consideration a certainty in disposition of the prisms (i.e., lessening a number of errors) during the manufacturing processes, however those prisms are same or similar to those in the functions and operations thereof, even if they are same in the height thereof.

Figure 1:
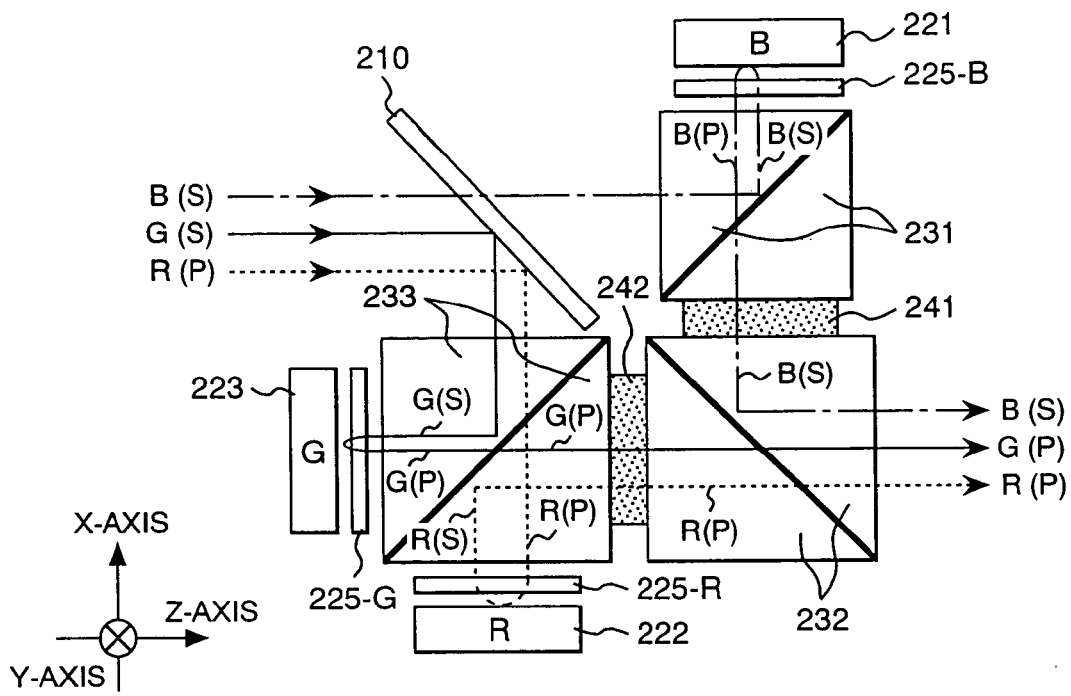
FIG. 1 is an explanatory plane view for showing the structure and the operations of an optical engine, as being a principle part of a projection-type image display apparatus, according to an embodiment of the present invention.

Next, in FIG. 1 attached is shown an upper view of the optical engine 200 mentioned above, in particular for showing the structure of the principle portion thereof in more detail. Further, the constituent elements being same to those shown in FIG. 6 mentioned above are attached with the same reference numerals. As is apparent from this detailed structure, in front of the reflection-type liquid crystal panel 221 for blue color (B), the reflection-type liquid crystal panel 222 for red color (R), and the reflection-type liquid crystal panel 223 for green color (G) are provided ¼ wavelength plate 225-R, 225-G and 225-B, respectively. The narrow bandwidth phase plate 241, which is inserted between the polarization light beam splitters 231 and 232 is that for rotating only the blue color (B) light by 90 degree in the polarization direction thereof selectively. And, the narrow bandwidth phase plate 242, which is inserted between the polarization light beam splitters 232 and 233, is that for rotating only the red color (R) light by 90 degree in the polarization direction thereof, selectively.

In FIG. 1 mentioned above are shown the condition of color division, R-, G- and B-modulations, and synthesizing of light, with respect to the light projected or emitted from the light source in the optical engine 200 mentioned above, by arrows and marks. However, though will be explained in the details thereof later, the light emitted from the light source, i.e., the light from the high brightness light source are removed with the wavelength components within regions of the infrared light and the ultraviolet light therefrom (i.e., thereby obtaining a white light), thereby obtaining a light flux or ray having a uniform distribution in an amount of light beams, and thereafter, they are incident upon in the form of P-polarization light for the red color (R) component thereof, while in the form of S-polarization light for the remaining green color (G) and blue color (B) light, for example.

As is apparent from FIG. 1 mentioned above, the light made of the R, G and B components motioned above is incident upon the dichroic mirror 210, at first, wherein the B-component light passes through it, while the R- and G-component light are reflected upon the surface thereof, i.e., being rotated by around 90 degree in the optical path. Thereafter, first the B-component light is reflected upon the polarization light beam splitter 231, to be rotated by 90 degree in the optical path thereof, and is in incident upon the reflection-type liquid crystal panel 221 for blue color (B). This B-component light is modulated in conformity with the image or video signal, and thereafter it turns back to the original optical path. In this instance, as was mentioned in the above, in the front of the each reflection-type liquid crystal panel 221 is provided the ¼ wavelength plate (in this case, the wavelength plate attached with the reference numeral 225-B). Thus, this ¼wavelength plate has a function of fitting or joining the optical axes of the polarization light beam splitters and the reflection axes of each of the reflection-type liquid crystal panels. Namely, for absorbing the manufacturing errors of the polarization light beam splitters and/or the manufacturing errors of those reflection-type liquid crystal panels, the fitting of the polarization axis is carried out by rotating the ¼ wavelength panel. However, in the figure, those light components are indicated by marks, such as B(P), B(S), for example. Thereafter, this B-light of the P-polarization light component is guided onto the polarization light beam splitter 232 in the form of the B-light of the S-polarization light component through the function of the narrow bandwidth phase plate 241 for rotating the polarization direction of the S-polarization light component, thereby to be synthesized or combined with other color component light.

On the other hand, being reflected upon the dichroic mirror 210, the R-component light, i.e., the P-polarization light penetrates through the polarization light beam splitter 233, thereby reaching to the reflection-type liquid crystal panel 222 for red color (R). And, after being modulated in conformity with the video signal, it turns back to the original optical path thereof. In this instance, also the P-polarization light is rotated in the polarization axis by rotating the ¼ wavelength plate 225-R provided in the front of the reflection-type liquid crystal panel 222, to be rotated in the polarization axis thereof, therefore the polarization axes of the polarization light beam splitter and the reflection-type liquid crystal panel are fitted to each other, optimally (see the marks R(P), R(S) in the figure). Thereafter, this R-light of the S-polarization light component becomes the R-light of the P-polarization light component by the function of the narrow bandwidth phase plate 242, rotating the polarization direction selectively, and thereby being guided onto the polarization light beam splitter 232 to be synthesized with other color component light.

Furthermore, the G-component light reflected upon the dichroic mirror 210 is further reflected upon the polarization light beam splitter 233, i.e., being rotated by 90 degree, thereby directing to the reflection-type liquid crystal panel 223 for green (G) color. And after being modulated in conformity with the video signal, it turns back onto the original optical path thereof. In this instance, also the polarization axes of the polarization light beam splitter and the reflection-type liquid crystal panel are fitted to each other optimally, by rotating the ¼ wavelength plate 225-G provided in front of the liquid crystal panel 223 (see the marks G(S) and G(P) in the figure). And thereafter, penetrating through the narrow bandwidth phase plate 242 unchanged, the G-light of the P-polarization light component is guided onto the polarization light beam splitter 232, thereby to be synthesized with other color component light.

Upon the polarization light beam splitter 232, as was mentioned above, the B-light (B(S)) of the S-polarization light component, the R-light (R(P)) of the P-polarization light component, and the G-light (G(P)) of the P-polarization light component are synthesized with, thereby being guide onto the projection lens, etc., which are provided in the rear stage thereof, in the form of the optical signal modulated in accordance with the video signal, to be projected onto the screen.

By the way, according to the various experiments made by the present inventors, the followings can be acknowledged: i.e., among those three (3) wavelength components of the light, being reflected upon the three (3) reflection-type image display elements of R, G and B, building up the optical engine mentioned above, to be modulated with, in particular, without accompanying the reflection of the G-component, being the light component at the highest in the relative visibility by human eyes, namely, with the structure of letting the P-polarization light to pass or penetrate through the two (2) polarization light beam splitters 233 and 232 unchanged, it is possible to make reduction of the G-component minimum in the optical amount within the system, e.g., in the two (2) of the PBSs building up the optical system of light synthesizing. Accompanying with this, according to the optical engine of such the structure, it can be also acknowledged that a projection image of superior picture quality can be obtained without losing the contrast on the picture obtained, also without reducing the brightness thereof, i.e., one of the other picture qualities. Namely, in the case where the G-component is reduced in the light amount thereof, it gives a large influence upon the relative visibility thereof, comparing to the R-component and/or the B-component, i.e., the other color components, the R-component or the B-component comes up in the intensity or strength thereof, and therefore the portion which should be displayed in black normally is tinged with red, or with blue, for example, thereby bringing about reduction of the contrast on the projection image or picture obtained.

It is also acknowledged, in that instance, with the R-component of the other color component light, as well as, with the remaining B-component thereof, a well-balanced image can be obtained, comparing to the G-component mentioned above, i.e., being superior in the contrast thereof, first for the former, with such the structure of the two (2) of the polarization light beam splitters building up the light synthesizing optical system, so that the R-component passes or penetrates through under the condition of the P-polarization light after being reflected thereupon under the condition of the S-polarization light, while for the latter, on the contrary to the above, the B-component is reflected thereupon under the condition of the S-polarization light after passing or penetrating therethrough under the condition of the P-polarization light.

Figure 2:
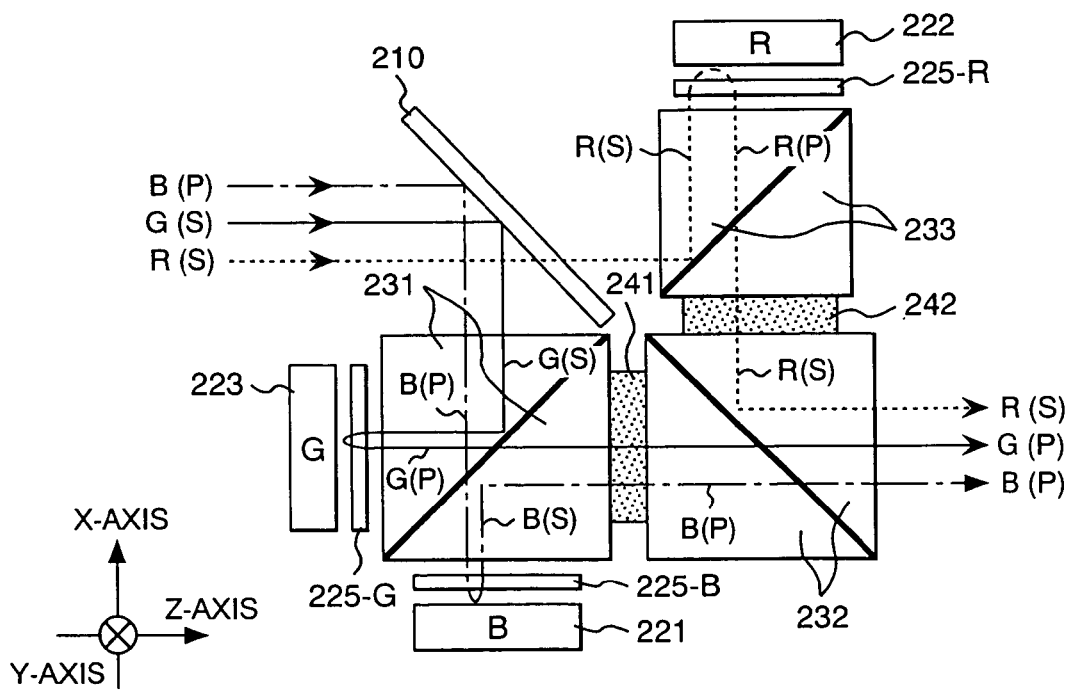
FIG. 2 is also an explanatory plane view for showing other structure of the optical engine shown in FIG. 1 mentioned above.

Alternatively, in the almost similar manner, it is also acknowledged that an image superior in the contrast can be obtained with the structure wherein, in the place thereof, the two (2) of the polarization light beam splitters building up the light synthesizing optical system are so structured that, for the R-component, it is reflected thereupon under the condition of the S-polarization light after penetrating therethrough under the condition of the P-polarization light, while on the other hand, for the B-component, it penetrates therethrough under the condition of the P-polarization light after being reflected thereupon under the condition of the S-polarization light, as is shown in FIG. 2 attached. However, with the structure shown in this FIG. 2, as is apparent from the figure, the dichroic mirror 210 reflects the B-component light and the G-component light thereupon while penetrating only the R-component light therethrough, and the reflection-type liquid crystal panel 221 for blue (B) color and the reflection-type liquid crystal panel 222 for red (R) color and further the narrow bandwidth phase plate 241 for blue (B) color and the narrow bandwidth phase plate 242 for red (R) are exchanged in the positions in the structure thereof.

In addition thereto, with the structure shown in FIGS. 1 and 2 mentioned above, it is also possible to change into a ½-wavelength plate from the narrow bandwidth phase plate (indicated by a reference numeral 241 in FIG. 1, while 242 in FIG. 2), which is provided between the polarization light beam splitter for reflecting only one component light thereupon to penetrate therethrough (but, PBS 231 for the B-light in FIG. 1, while PBS 233 for the R-light in FIG. 2) and the narrow bandwidth phase plate 232 for conducting optical synthesizing thereupon. A reason of this lies in the fact that the function of this narrow bandwidth phase plate is only polarizing the B-light from the P-polarization light into the S-polarization light, or the R-light from the P-polarization light into the S-polarization light, therefore it can be replaced with a cheap one; i.e., the ½-wavelength plate. Further, applying as such the ½-wavelength plate, a ½-wavelength plate made of inorganic material, such as quartz, for example, brings about a relatively cheap one, having a superior light resistance or stability, thereby contributing to an improvement of the apparatus, as a whole, in particular in the light resistance or stability thereof.

Figure 7:
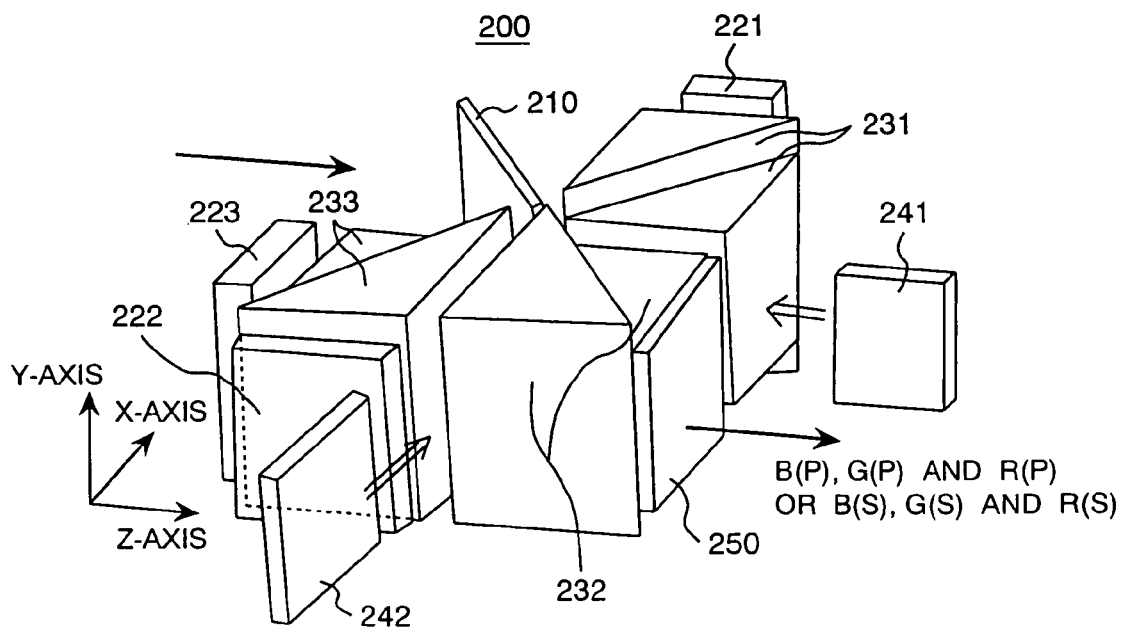
FIG. 7 is a perspective view for showing further other embodiment of the optical system shown in FIG. 6 mentioned above.

Moreover in FIG. 7 attached, there is shown further other embodiment of the optical engine 200 mentioned above, and in this example, on an light emission surface of the polarization light beam splitter 232 is provided a narrow bandwidth phase plate 250 for rotating the plane of polarization of the B-light selectively. Namely, with such the structure, as is shown in the figure, the emitted light from the optical engine 200, i.e., all the light beam or flux from the polarization light beam splitter 232 are P-polarization light in the light components thereof, i.e., B(P), G(P) and R(P). Or, it is also possible to further rotate the planes of polarization of all components of the light flux by 90 degree with provision of a ½-wavelength plate not shown in the figure, thereby obtaining the light flux of the S-polarization light.

Next, hereinafter will be made detained explanation by referring to FIG. 8 attached, on the principal structure of the light source portion or device (i.e., the illumination optical system) 100 for emitting a light flux incident upon the optical engine 200 mentioned above, which removes the wavelength components of the infrared light and the ultraviolet light from the light obtained from the high brightness light source mentioned above (i.e., obtaining a white-color light) so as to obtain the light flux having a uniform distribution of a light amount. However, the light source portion 100 shown here in supplies the polarization light to the optical engine 200 constructed as shown in FIG. 2, on a Y-Z plane; i.e., the red-color (R) component and the green-color (G) component are in the form of the P-polarization light, while the blue-color (B) component in the form of the S-polarization light. Also, within a Z-x plane of the optical engine 200 shown in FIG. 2, the blue-color (B) component corresponds to the P-polarization light, while the green-color (G) component and the red-color (R) component to the S-polarization light. With such the structure as was mentioned above, there may occur sometimes cases, where the dichroic mirror 210 and the polarization light beam splitters 231 and 232 are superior in the characteristics thereof with respect to the green-color (G) component and the red-color (R) component corresponding to the S-polarization light on the Z-X plane, to the case where the light formed to be the S-polarization light on the Z-X plane are incident thereupon respectively.

Figure 8:
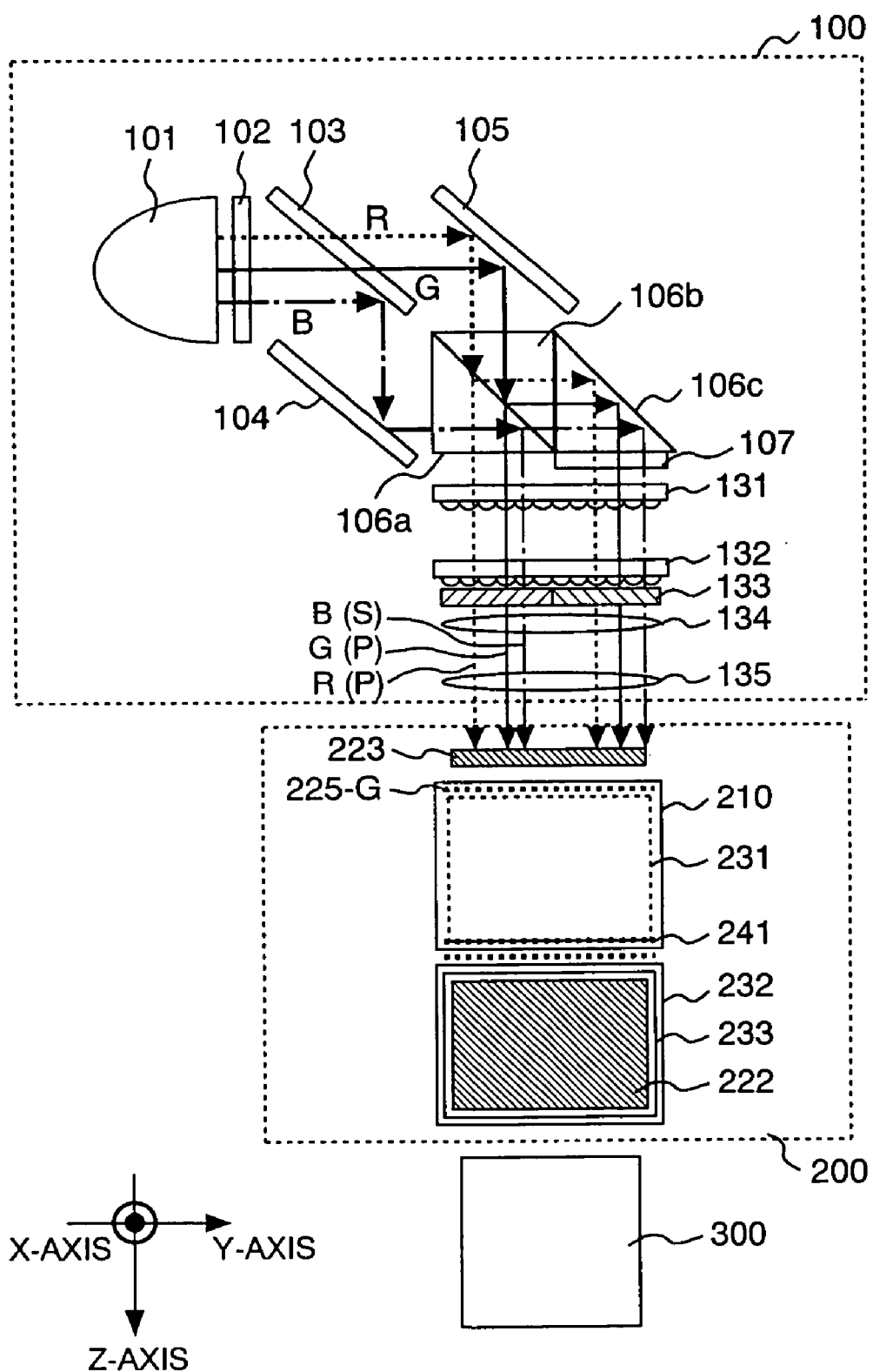
FIG. 8 is a plane view for showing the structure of peripheries including an optic or light source (an illumination optical system) in the projection-type image display apparatus mentioned above.

Firstly in FIG. 8, the light source portion or device 100 is constructed with, including a high brightness light source 101 therein, being made of, such as a super high-pressure mercury lamp, a metal halide lamp, a xenon arc lamp, a mercury-xenon arc lamp, an iodine lamp (or a tungsten halogen lamp), etc., for example. Also, the light flux emitted from this light source portion 100 passes through a filter 102 for removing therefrom the wavelength light of the infrared light and the ultraviolet light through absorption or reflection therein, and thereafter is guided into the color dividing portion, which is constructed by a dichroic mirror 103 for reflecting thereupon only a light of the predetermined color component while penetrating through the others, and also two (2) pieces of reflection mirrors 104 and 105 provided in the rear stage thereof. Furthermore, the light divided in this color dividing portion passes through an optical element, which is made up by combining polarization light beam splitters 106a and 106b and is further provided with a ½-wavelength plate 107 on an light-emission opening thereof, in the structure.

Figure 9:
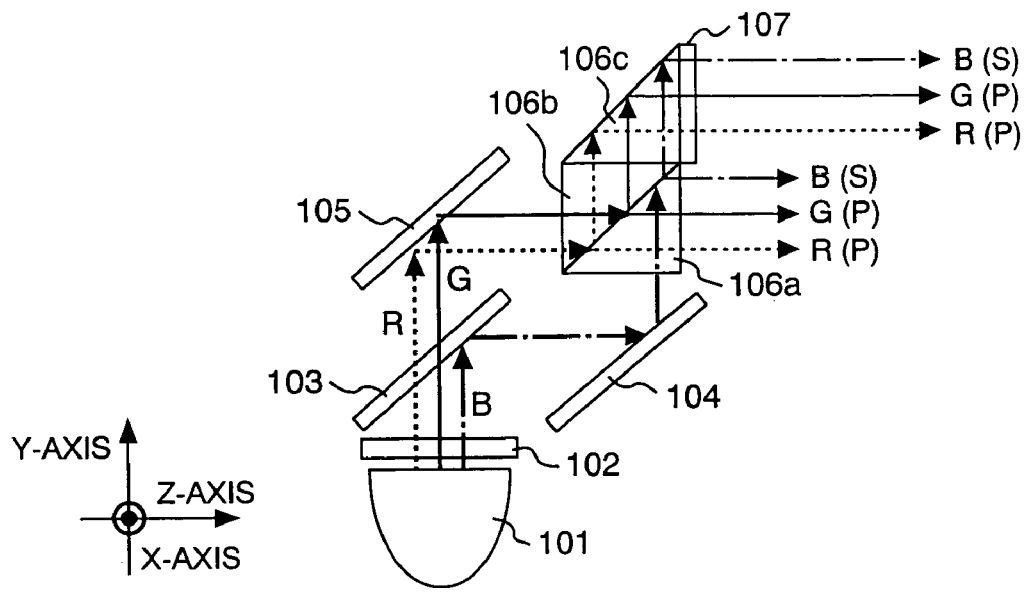
FIG. 9 is a plane view for showing an example of the structure and the operations of the optic source shown in FIG. 8 mentioned above.

With such the configuration, as is apparent from the explanatory view of FIG. 9 attached, the blue-color (B) light of the S-polarization light and the green-color (G) and the red-color (R) light of the P-polarization light can be obtained. Namely, with the light flux from the high brightness light source 101, the B-component light thereof is reflected upon the dichroic mirror 103 to be directed to the one reflection mirror 104, while the G-component light and the R-component light pass through as they are and direct to the other reflection mirror 105. Next, this B-component light reflected upon those reflection mirrors 104 and 105, as well as the G- and R-component light, are incident upon the different surfaces of the polarization light beam splitters 106a and 106b, respectively. Upon those polarization light beam splitters 106a and 106b, the S-polarization light of the B-light coming from the reflection mirror 104 is reflected, while the P-polarization light thereof penetrates therethrough. Also, the P-polarization light of the G- and R-component light coming from the reflection mirror 105 penetrate therethrough, while the S-polarization light are reflected thereupon. Further, being reflected upon the reflection prism 106c, and also in addition thereto being converted in the plane of polarization by the function of the ½-wavlength plate 107 provided at the light-emission opening, the B-light of the P-polarization light and the G- and the R-light of the S-polarization light, penetrating through those polarization light beam splitters 106a and 106b, are emitted as the B-light of the S-polarization and the G- and the R-light of the P-polarization. Namely, the blue-color light (indicated by B(S) in the figure) of the S-polarization, the red-color light of the P-polarization (indicated by R(P) in the figure), and the green-color light of the P-polarization (indicated by G(P) in the figure) are obtained herein.

Returning to FIG. 8 mentioned above, again, the light fluxes being different in the polarization (i.e., B(S), G(P), R(P)), then next, are incident upon the two (2) pieces of multi-lens arrays 131 and 132. Namely, the light fluxes incident thereupon are divided into by the number of the lenses in plurality, by the function of the multi-lens array 131, and are enlarged or expanded by the function of the corresponding multi-lens array 132 provided in the rear stage thereof, to be projected on the reflection-type liquid crystal panel, respectively. Since the light flux overlaps on the panel by the number of the multi-lenses provided on the multi-lens array 131, therefore a light can be obtained having a uniform distribution in a light mount. This light flux, further through a filter 133 and lenses 134 and 135, becomes a light flux of a predetermined size, and is emitted to the optical engine 200 provided in the rear stage thereof.

Although in this FIG. 8 are also shown the optical engine 200 (corresponding to that shown in FIG. 2 mentioned above) building up the projection-type image display apparatus mentioned above, and the projection lens 300, at the same time, however the optical engine 200, the structure of which was already disclosed, is shown herein under the condition that it is viewed from a reverse side in FIG. 6 mentioned above, in particular in the fore-and-aft direction on the paper surface thereof (namely, in the direction of the X axis in FIG. 6 mentioned above).

Also, with applying an optical engine having the structure shown in FIG. 7 mentioned above, for example, in the place of the optical engine having the structure shown in FIG. 6 mentioned above, as the optical engine 200 shown in this FIG. 8, it is possible to project the entire components of the emission light thereof expansively, to be seen-through, under the condition of the P-polarization or the S-polarization through the projection lens 300. In particular, with the projection-type image display apparatus, wherein the emission light from the projection lens 300 is reflected upon the reflection mirror (500 or 700) thereafter, as was shown in FIG. 3 or 4 mentioned above, it is possible to obtain an improvement in the reflecting power or reflection factor on the reflection surface, by making the entire components of the emission light into the P-polarization or the S-polarization. In particular, by making the entire components of the emission light in to the S-polarization due to the characteristics of the polarization light component upon the reflection surface thereof, an effect can be obtained that the reflecting power upon the reflection mirror can be improved by a degree of about 5%, comparing to the others.

Figure 10:
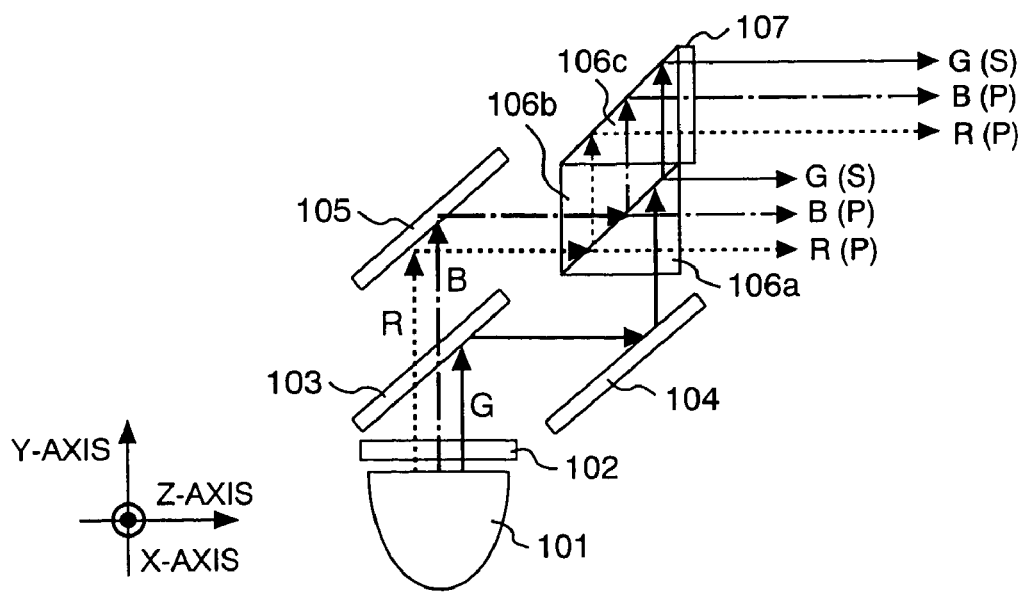
FIG. 10 is a plane view for showing other example of the structure and the operations of the optic source shown in FIG. 8 mentioned above.

Moreover, the light source portion or device 100 mentioned above may be constructed with, in a combination of the dichroic mirror 103 thereof and the polarization light beam splitters 106a and 106b and the reflection prism 106c, as shown in FIG. 10, for example. Furthermore, it is needless to say that, also the structure of the projection-type image display apparatus shown in FIG. 8 mentioned above, though not shown in the figure herein, may be altered or changed, appropriately.

As was fully mentioned in the above, with the reflection-type image projection unit or device, with the reflection-type image display apparatus applying such the image projection unit therein, and also with the light source for use therein, according to the present invention, there can be provided an excellent projection-type image display apparatus, being superior in the display characteristics of an image or picture, including the contrast, and being able to be small in the sizes thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A light source device for use in a reflection-type image display apparatus comprising:
 a light source component which emits light comprising a first color component, a second color component, and a third color component, each of the color components comprising P-polarized light and S-polarized light;
 a polarizer component; and
 a color divider arranged to receive the light emitted from the light source and to direct the emitted light to the polarizer component,
 the polarizer component comprising:
 a polarization beam splitter (PBS) comprising a first input face, a second input face, a first output face, and a second output face;
 a reflector having an input face optically coupled to the first output face of the PBS; and
 a one-half wavelength plate optically coupled to an output face of the reflector,
 wherein the color divider is further configured to direct the first color component and the second color component of the emitted light into a first input face of the PBS and to direct the third color component of the emitted light into a second input face of the PBS,
 wherein outgoing light is output from the second output face of the PBS and from the one-half wavelength plate and can be directed to an optical image forming unit.

2. The device of claim 1 wherein the first light component is a red-color light component, wherein the other two light components are a blue-color light component and a green-color light component.

3. The device of claim 2 wherein the red-color light component is S-polarized, wherein the blue-color light component and the green-color light component each is P-polarized.

4. The device of claim 2 wherein the blue-color light component is S-polarized, wherein the red-color light component and the green-color light component each is P-polarized.

5. The device of claim 1 wherein the first light component is a blue-color light component, wherein the other two light components are a red-color light component and a green-color light component.

6. The device of claim 1 wherein the color divider comprises a combination of a first mirror, a second mirror, and a dichroic mirror, the dichroic mirror being incident to the emitted light and configured to be transmissive of the first color component and the second color component and to reflect the third color component, the first mirror arranged to reflect the first color component and the second color component into the first input face of the PSB, the second mirror arranged to reflect the third color component into the second input face of the PSB.

7. A light source device for use in a reflection-type image display apparatus comprising:
 a lamp configured to produce emitted light comprising P-polarized light and S-polarized light;
 a color divider arranged to receive the emitted light and configured to direct a first color component and a second color component of the emitted light along a first optical path and to direct a third color component of the emitted light along a second optical path different from the first optical path, the color components each comprising P-polarized light and S-polarized light, light traveling along the first optical path being substantially exclusive of the third color component, light traveling along the second optical path being substantially exclusive of the first color component and the second color component; and a polarizing device having a first input face upon which light traveling along the first optical path is incident and a second input face upon which light traveling along the second optical path is incident.

8. The device of claim 7 wherein the color divider comprises a combination of a first mirror, a second mirror, and a dichroic mirror, the dichroic mirror being incident to the emitted light and configured to be transmissive of the first color component and the second color component and to reflect the third color component, the first mirror arranged to reflect the first color component and the second color component into the first input face of the polarizing device, the second mirror arranged to reflect the third color component into the second input face of the polarizing device.

9. The device of claim 7 wherein the polarizing device comprises a polarization beam splitter (PSB), a reflector, and a ½-wavelength plate optically coupled to an output face of the reflector, the PSB having a first face upon which the first color component and the second color component are incident, the PSB having a second face upon which the third color component is incident, the PSB having a first output face through which some portion of the first color component, some portion of the second color component, and some portion of the third color component are transmitted, the PSB having a second output face to which the reflector is optically coupled, whereby another portion of the first color component, another portion of the second color component, and another portion of the third color component are transmitted through the second output face of the PSB, reflected through the ½-wavelength plate by the reflector.

* * * * *